(12) United States Patent
Takahashi

(10) Patent No.: US 6,307,982 B1
(45) Date of Patent: Oct. 23, 2001

(54) OPTICAL FIBER SWITCH

(75) Inventor: Mitsuo Takahashi, Matsudo (JP)

(73) Assignee: Seikoh Giken Co., Ltd., Matsudo (JP)

( * ) Notice: Subject to any disclaimer, the term of this patent is extended or adjusted under 35 U.S.C. 154(b) by 0 days.

(21) Appl. No.: 09/352,997

(22) Filed: Jul. 13, 1999

(30) Foreign Application Priority Data

Sep. 11, 1998 (JP) .................................. 10-257789

(51) Int. Cl.[7] .................................................. G02B 6/26
(52) U.S. Cl. .............................. 385/16; 385/17; 385/25; 385/31
(58) Field of Search ............................. 385/16, 17, 24, 385/25, 31, 52, 66, 84, 85, 134–137

(56) References Cited

U.S. PATENT DOCUMENTS

| | | | |
|---|---|---|---|
| 4,886,335 | * 12/1989 | Yanagawa et al. | 385/16 |
| 5,066,094 | 11/1991 | Takahashi . | |
| 5,317,659 | 5/1994 | Lee . | |
| 5,337,378 | * 8/1994 | Saito et al. | 385/16 |
| 5,446,810 | * 8/1995 | Watanabe et al. | 385/22 |
| 5,613,021 | * 3/1997 | Saito et al. | 385/17 |

FOREIGN PATENT DOCUMENTS

| | | |
|---|---|---|
| 01099016 | 4/1989 | (JP) . |
| 02171713 | 7/1990 | (JP) . |
| 04199017 | 7/1992 | (JP) . |
| 06075178 | 3/1994 | (JP) . |
| 06202014 | 7/1994 | (JP) . |

* cited by examiner

*Primary Examiner*—Hemang Sanghavi
*Assistant Examiner*—Omar Rojas
(74) *Attorney, Agent, or Firm*—Venable; Robert J. Frank; Gabor J. Kelemen

(57) ABSTRACT

An optical fiber switch of the present invention is composed of a fixed side ferrule assembly and a movable side ferrule assembly. The fixed side ferrule assembly is composed of a multiplicity of lined-up sleeves 12, a fixed side ferrule support plate 10 for two-dimensionally disposing the sleeves 12 on an X-Y plane and supporting them and a multiplicity of fixed side optical fiber ferrules 13 which are inserted into the lined-up sleeves and supported thereby. The movable side ferrule assembly includes X, Y-axis drive mechanism for supporting the movable side optical fiber ferrule 29 and relatively two-dimensionally moving it on an X-Y plane with respect to the fixed side ferrule assembly and a Z-axis drive mechanism A for relatively moving it in a direction (Z-direction) orthogonal to the plane. The movable side optical fiber ferrule 29 is detachably moved to an arbitrary sleeve 12 of the fixed side ferrule assembly.

6 Claims, 5 Drawing Sheets

OPTICAL FIBER SWITCH

BACKGROUND OF THE INVENTION

1. Field of the Invention

The present invention relates to an optical fiber switch used to the watch of an optical fiber communication system and to a light measuring instrument. In particular, the present invention relates to a multi-circuit optical fiber switch with several hundreds or more of switching circuits which is intended to increase an operating speed, enhance reliability and optical capability, make maintenance and recovery easy, and reduce a size.

2. Description of the Related Art

Papers (B-973), (B-974) and (B-975) which were reported in Electronic Society Meeting of The Institute of Electronics, Information and Communication Engineers held in 1996 proposed a multi-circuit switch having a great many number of switching circuits. FIG. 7, FIG. 8 and FIG. 9 are schematic views explaining the conventional multi-circuit switch, wherein FIG. 7 is a plan view explaining the principle of the multi-circuit switch, FIG. 8 is a front sectional view explaining the principle of the multi-circuit switch shown in FIG. 7 and FIG. 9 is another front sectional view explaining the principle of the multi-circuit switch, likewise. The conventional multi-circuit switch is composed of a linearly moving type multi-circuit switch using optical fibers and lined-up V-shaped-groove arrays.

A necessary number of V-shaped-groove arrays 3, 3 . . . 3 are disposed to the rectangular member 2 of a fixed side optical fiber assembly and processed at right angles to the longitudinal direction of the rectangular member 2. Fixed side optical fiber cables 8, 8 . . . 8 are bonded and fixed to the rectangular member 2 so that the optical fibers 1, 1 . . . 1 at the extreme ends of the optical fiber cables 8 are lined up in the V-shaped-groove arrays 3. A screw rod 4 of a movable side optical fiber assembly is driven by a not shown stepping motor. A screw hole 5 is formed to a slide block 7 so that it is meshed and engaged with the screw rod 4. The extreme end of a movable side optical fiber cable 9 and the extreme ends of the optical fibers 6 at the extreme ends of the optical fiber cables 8 are projected from the slide block 7 and fixed thereto.

FIG. 8 shows a state that the movable side optical fiber 6 is connected to the fixed side optical fiber 1. The slide block 7 is slightly rotated in the direction of an arrow (clockwise) by a not shown actuator to thereby press the movable side optical fiber 6 against a V-shaped groove 3 and they are connected to each other while matching optical axes of the movable side optical fiber 6 and the fixed side optical fiber 1. FIG. 9 shows a state that the movable side optical fiber 6 is disconnected from the fixed side optical fiber 1. The slide block 7 is slightly rotated by the not shown actuator in the direction of an arrow (counterclockwise) to thereby displace upward and move the movable side optical fiber 6 from the V-shaped groove 3.

The conventional switch proposes to selectively connect many circuits and the optical fiber switch is arranged as a linearly moving type switch using the optical fibers and the lined-up V-shaped-groove arrays. However, there are many drawbacks to practically use the multi-circuit switch.

A first drawback is that the optical fibers are liable to be broken because they have a very thin diameter of 0.125 mm.

A second drawback is that it is difficult to cause the extreme end of the movable side optical fiber to come into intimate contact with the V-shaped groove only by the bending force of the movable side optical fiber. Further, the absolute value of insertion loss and the dispersion thereof are liable to increase because it is difficult to prevent the deposition of dust in the V-shaped groove. This fact has been confirmed by the experiment executed by the inventors of the present invention.

A third drawback is that if, for example, 1×400 switches are arranged by disposing 8-wire ribbon optical fibers at intervals of 3.2 mm in the arrangement of a multi-circuit switch, a length of 160 mm is required only by the section where the V-shaped grooves of a fixed side optical fiber mounting plate are formed. Thus, it is impossible to reduce the size of an optical fiber switch.

A fourth drawback is that when there is a difference between the coefficients of linear thermal expansion of the rectangular member 2 for mounting the fixed side optical fibers and the screw rod 4 or when these components are placed in environments having a different temperature, an amount of positional displacement between the V-shaped groove and the movable side optical fiber is increased and an increase in the number of circuits makes the positional displacement more remarkable. As a result, there is a possibility that the movable side optical fiber cannot be accurately guided into the V-shaped groove and is broken by strain.

A fifth drawback is that since the slide block 7 is driven by the screw rod 4 which is driven by the stepping motor, the operation speed of the slide block 7 cannot be made so fast. When for example, the diameter of the screw rod 4 is 6 mm and the screw pitch thereof is 1 mm, the stepping motor must make 160 revolutions to move the slide block 7 by 160 mm. Many of stepping motors used for the above purpose require 500 pulses to make one revolution. If it is supposed that the number of input control pulses is 4000 pulses/sec. when this type of the motor is used, the stepping motor makes 8 revolutions per second. As a result, 20 seconds are necessary to cause the stepping motor to make 160 revolutions even if a motor accelerating and decelerating times are not taken into consideration. Accordingly, the stepping motor is not suitable for the application which requires a high speed operation.

A sixth drawback is that in the linearly moving type multi-circuit switch which employs the optical fibers and the lined-up V-shaped arrays, there is increased probability that the optical fibers are partially broken. Therefore, the optical fibers must be replaced and repaired. However, the replacement and repair of fixed side ribbon optical fibers are not easy, although the movable side ribbon optical fibers can be relatively easily replaced and repaired.

The linearly moving type multi-circuit switch using the optical fibers and the lined-up V-groove-shaped arrays designed based on the conventional idea has problems in reliability as described above and there are many technical problems to be solved to practically use the switch. Accordingly, there has been desired to realize a multi-circuit optical fiber switch of high reliability which is designed based on a novel idea.

It is an object of the present invention to solve the problems of the conventional multi-circuit optical fiber switch described above and provide a multi-circuit optical fiber switch designed by a novel idea which has an increased operational speed, enhanced reliability and optical capability and a reduced size and can be easily maintained and repaired.

It is another object of the present invention to provide an optical fiber switch which has ferrules with fixed side optical fibers and lined-up sleeves disposed on X-Y rectilinear coordinates as well as can be driven in X- and Y-axis directions simultaneously by means of two-dimensional X-Y slide blocks which are driven in X- and Y-axis directions by stepping motors.

It is still another object of the present invention to provide a multi-circuit optical fiber switch of high reliability which is arranged such that a ferrule with a movable side optical fiber is attached to an actuator driven in a Z-axis direction and selectively inserted into a lined-up sleeve located at an arbitrary coordinate position so that it can be connected a ferrule with a fixed side optical fiber inserted into the lined-up sleeve.

It is a further object of the present invention to provide a multi-circuit optical fiber switch of high reliability which uses, as its basic components, ferrules with optical fibers and lined-up sleeves, which have been used as a part of an APC (angled physical contact) optical connector having been completed to a high technical level, and has a connecting capability as high as that of the APC optical connector. It should be noted that the term "physical contact" means to contact physically and thus the apex of the optical fiber in the APC is polished to an inclined spherical shape.

To this end, according to one aspect of the present invention, there is provided a multi-circuit optical fiber switch, comprising a fixed side ferrule assembly composed of a multiplicity of lined-up sleeves, a fixed side ferrule support member for two-dimensionally disposing the sleeves on an X-Y plane and supporting them and a multiplicity of fixed side optical fiber ferrules inserted into the lined-up sleeves and supported thereby, and a movable side ferrule assembly for supporting a movable side optical fiber ferrule and relatively two-dimensionally moving it on the X-Y plane with respect to the fixed side ferrule assembly as well as moving it in a direction (Z-direction) orthogonal to the X-Y plane by a Z-direction drive mechanism to thereby move the movable side optical fiber ferrule to an arbitrary sleeve of the fixed side ferrule assembly so that it can be attached thereto and detached therefrom.

A multi-circuit optical fiber switch, wherein the fixed side ferrule support member is composed of a flat plate member, stepped holes are formed to the flat surface member in the numbers of M (M=1, 2 . . . ) and N (N=1, 2 . . . ) in the lateral (X) direction and the longitudinal (Y) direction of the surface of the flat plate member so that they are orthogonal in the lateral direction and the longitudinal direction and the fixed side optical fiber ferrules are detachably inserted into the lined-up sleeves disposed to the respective stepped holes and fixed therein, and the movable side ferrule assembly comprises a coupling plate having a pair of X-axis slide blocks driven by a first stepping motor on a pair of slide rails disposed on the back surface of the fixed side ferrule mounting plate assembly along the lateral (X) direction in parallel therewith, X-, Y-direction slide table assembly composed of a Y-axis slide block driven by a second stepping motor on a slide rail mounted on the coupling plate at right angles in the longitudinal (Y) direction, and a Z-direction drive mechanism mounted on the Y-axis slide block and reciprocating in a Z-direction, whereby the multi-circuit optical fiber switch is arranged as a 1×(M×N) orthogonally-disposed-type switch.

A multi-circuit optical fiber switch, wherein the first stepping motor and the second stepping motor can be driven at the same time to thereby cause the movable side optical fiber ferrule to correspond to the arbitrary fixed side optical fiber ferrule.

A multi-circuit optical fiber switch, wherein the X-axis slide blocks of the orthogonally-disposed-type optical fiber switch is driven by the power transmission made by the mesh between a gear disposed to the shaft of the first stepping motor mounted on the coupling plate and meshed and a linear-tooth-shaped rack disposed to the fixed side ferrule mounting plate assembly and the Y-axis slide table is driven by the power transmission made by the mesh between a gear disposed to the shaft of the second stepping motor mounted on the coupling plate and a linear-tooth-shaped rack disposed to the Y-axis slide block.

An L×(M×N) orthogonally-disposed-type multi-circuit optical fiber switch, wherein a plurality of the movable side ferrule assemblies (L≧2) are simultaneously used and the respective ones of the assemblies are caused to correspond to L (M×N) pieces of the fixed side ferrules so that the movable side optical fibers can be simultaneously connected to the fixed side optical fibers.

A multi-circuit optical fiber switch, wherein the Z-direction drive mechanism reciprocating in the Z-direction is composed of a latching solenoid for reciprocating an actuator rod by switching the polarity of a current.

A multi-circuit optical fiber switch, wherein the extreme end surfaces of the respective fixed side ferrules and movable side ferrules of the orthogonally-disposed-type optical fiber switch are polished to inclined spherical surfaces having an inclined angle of 4° or more with respect to a surface orthogonal to an optical axis.

DESCRIPTION OF THE PREFERRED EMBODIMENT

Figure 1:
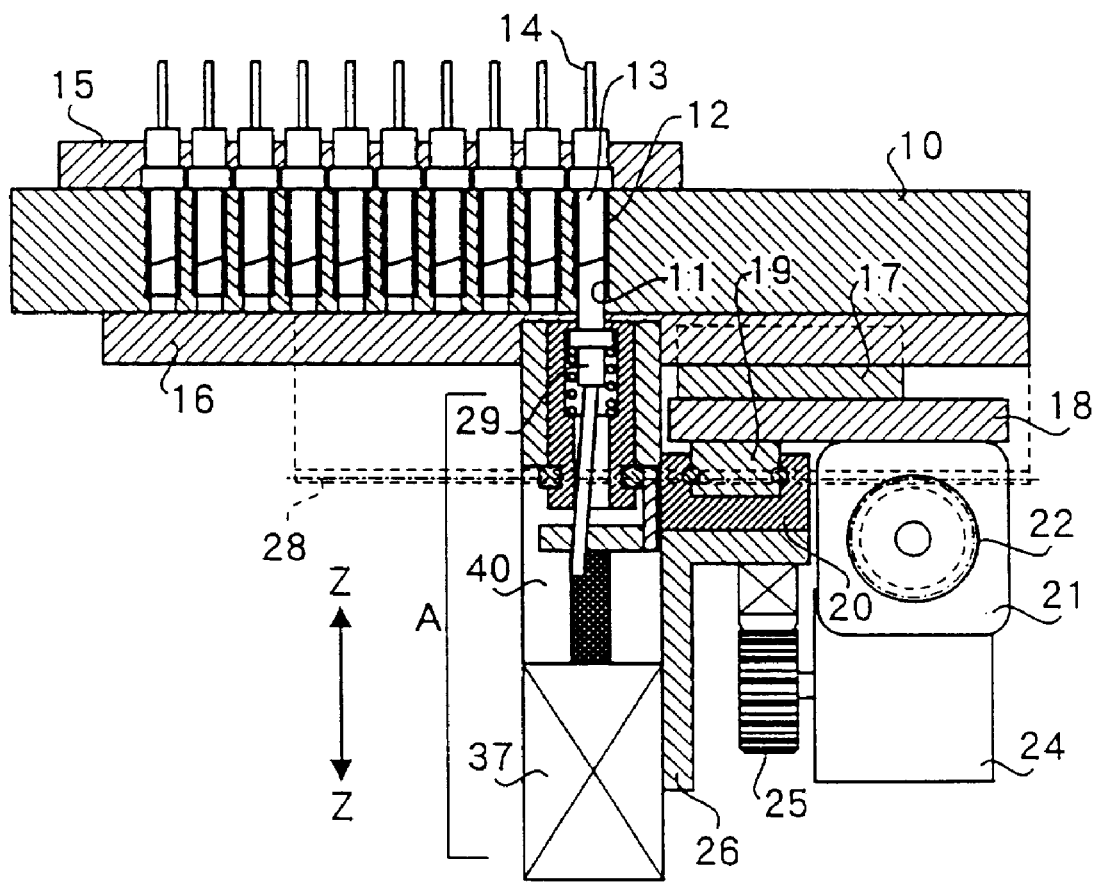
FIG. 1 is a side sectional view of an embodiment of an optical fiber switch (1×400 circuits) according to the present invention.
Figure 2:
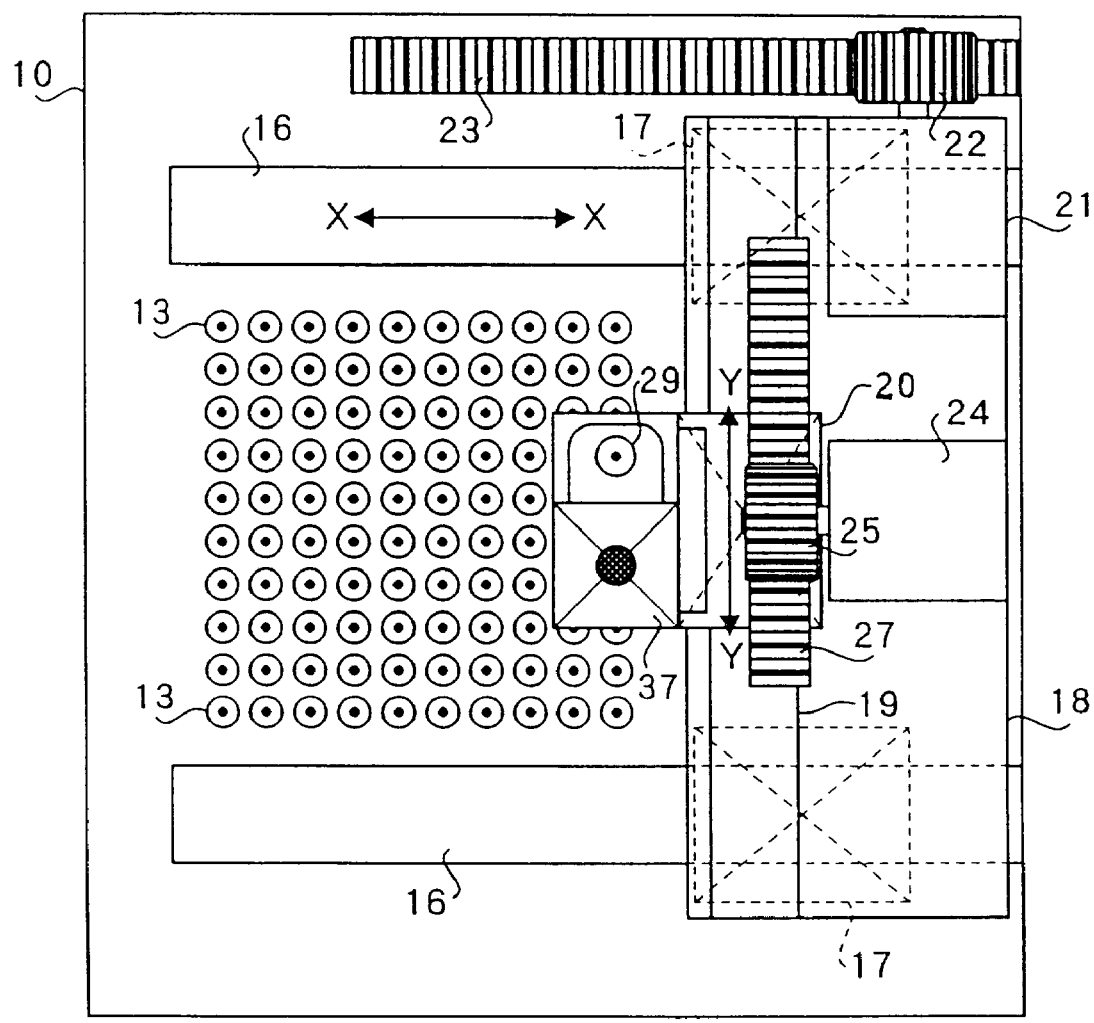
FIG. 2 is a bottom view of the switch of the embodiment.

Embodiments of a multi-circuit optical fiber switch according to the present invention will be described below in more detail with reference to the accompanying drawings and the like. FIG. 1 is a side sectional view of an embodiment of the multi-circuit optical fiber switch according to the present invention. The multi-circuit optical fiber switch of the embodiment is an optical fiber switch having 1×400 circuits capable of connecting one movable side optical fiber to any arbitrary one of 400 (20×20) fixed side optical fibers. FIG. 2 is a backside view of the embodiment of the optical fiber switch having the 1×400 circuits.

A fixed side ferrule mounting plate 10 constituting the ferrule mounting means of a fixed side ferrule assembly has stepped holes 11 amounting to 400 pieces in total which are formed thereto orthogonally in a lateral (X) direction and a longitudinal (Y) direction in the number of 20×20 pieces. Lined-up sleeves 12 are inserted into the respective stepped holes 11 and fixed therein. Fixed side optical fiber ferrules 13 having optical fibers 14 attached thereto are inserted up to the central portions of the lined-up sleeves 12. A presser plate 15 is used to fix the fixed side optical fiber ferrules 13 to the fixed side ferrule mounting plate 10. The removal of the presser plate 15 permits all of or any arbitrary one of the optical fibers to be replaced or repaired.

A pair of X-axis slide rails 16 are disposed on the back surface of the fixed side ferrule mounting plate 10 along the lateral (X) direction in parallel therewith. A pair of X-axis slide blocks 17, 17 are linearly movably engaged with the X-axis slide rails 16. A coupling plate 18 is used to couple the pair of X-axis slide blocks 17, 17 to move the pair of X-axis slide blocks 17, 17 integrally with each other. A Y-axis slide rail 19 is mounted on the coupling plate 18 in the longitudinal (Y) direction. A Y-axis slide block 20 is linearly movably engaged with the Y-axis slide rail 19. An X-axis linear-tooth-shaped rack 23 is disposed on the back surface of the fixed side ferrule mounting plate 10 along the lateral (X) direction in parallel therewith. A first stepping motor 21 is fixed to the coupling plate 18. A pinion gear 22 is disposed to the extreme end of the rotational shaft of the first stepping motor 21 and meshed with the X-axis linear-tooth-shaped rack 23. Therefore, the forward and reverse rotation of the pinion gear 22 permits the coupling plate 18 mounted on the pair of the X-axis slide blocks 17, 17 to be optionally moved in the lateral (X) direction.

A second stepping motor 24 is fixed to a fixed side optical fiber assembly at the illustrated position and a pinion gear 25 is disposed to the extreme end of the rotational shaft of the stepping motor 24. The Y-axis slide rail 19 is fixed to the coupling plate 18 and the Y-axis slide block 20 for supporting an adapter plate 26 is supported by the Y-axis slide rail 19 so as to move in the Y-axis direction. A Y-axis linear-tooth-shaped rack 27 is fixed to the adapter plate 26 along the longitudinal (Y) direction in parallel therewith. The pinion gear 25 is engaged with the Y-axis linear-tooth-shaped rack 27 by being meshed therewith. Therefore, the forward and reverse rotation of the pinion gear 25 permits the adapter plate 26 mounted on the Y-axis slide block 20 to be moved in the longitudinal (.Y) direction.

The modules of the pinion gears 22, 25 and the tooth-shaped racks 23, 27 are set to 0.5, respectively and the numbers of teeth of the pinion gear 22, 25 are set to 30 and the diameters of the pinion gears 22, 25 are set to 17.5 mm. Therefore, the X-axis slide blocks 17 and the Y-axis slide block 20 move about 55 mm each time the pinion gears 22, 25 rotate once.

The section indicated by A in FIG. 1 shows the Z-axis drive mechanism of a movable side ferrule assembly. The Z-axis drive mechanism A of the movable side ferrule assembly is mounted on the adapter plate 26 and can be optionally moved on an X-Y plane by the aforesaid mechanism. Then, the movable side ferrule assembly is recipro- cated in a direction (Z) orthogonal to the X-Y plane (=ferrule optical axis direction) by the Z-axis drive mechanism which will be described below in detail at respective positions.

Figure 3:
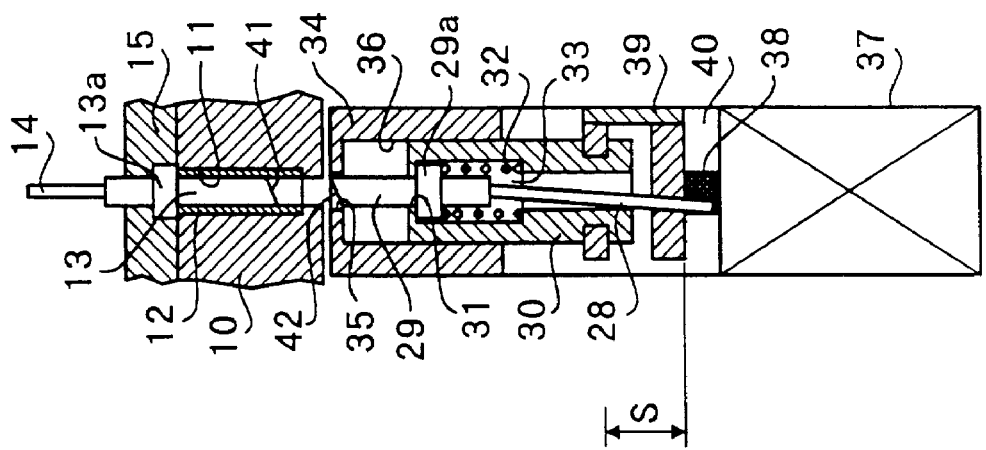
FIG. 3 is an enlarged side sectional view of the Z-direction drive mechanism of the switch of the embodiment and shows a state that a movable side ferrule with an optical fiber is not connected to fixed side ferrules with optical fibers.
Figure 4:
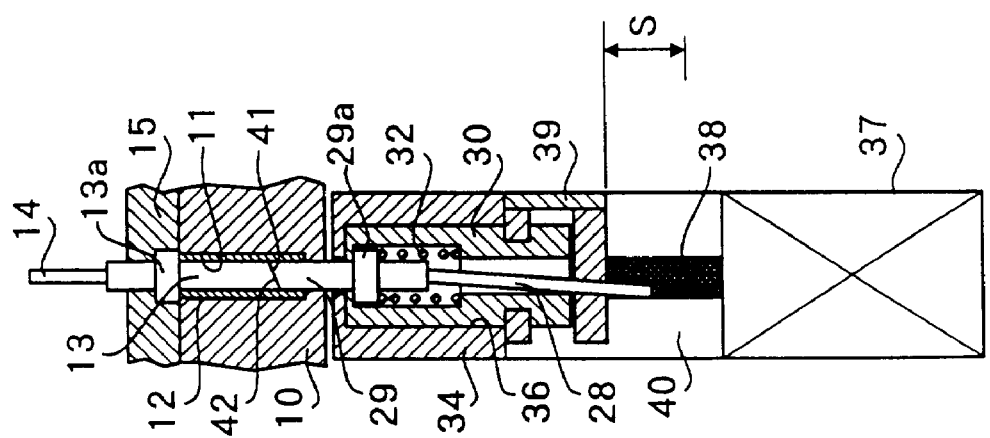
FIG. 4 is an enlarged side sectional view of the Z-drive mechanism of the switch of the embodiment and shows a state that the movable side ferrule with the optical fiber is connected to the fixed side ferrules with the optical fibers.

Next, the Z-axis drive mechanism A of the movable side ferrule assembly will be described in more detail with reference to FIG. 3 and FIG. 4. FIG. 3 is an enlarged side sectional view showing the relationship between the Z-axis drive mechanism and an arbitrary fixed side optical fiber ferrule in the switch of the embodiment, wherein a ferrule with a movable side optical fiber is not connected to the ferrule with the fixed side optical fiber. FIG. 4 is an enlarged side sectional view of the Z-axis drive mechanism, wherein the ferrule with the movable side optical fiber is connected to the ferrule with the fixed side optical fiber.

As shown in FIG. 1, the Z-axis drive mechanism A is mounted on the adapter plate 26. The movable side optical fiber ferrule 29 supports the optical fiber cable and has a flange section 29a disposed at the center thereof. Formed to the extreme end of a ferrule holder 30 are a small diameter hole 31 for guiding the outside diameter portion of the movable side optical fiber ferrule 29 and a stepped hole 33 for accommodating a coil spring 32 for urging the movable side optical fiber ferrule 29. The movable side optical fiber ferrule 29 is inserted into the ferrule holder 30 and assembled as shown in FIG. 3 so that it is urged upward by the coil spring 32 at all times. A guide bush 34 guides the ferrule holder 30 in an upward/downward (Z) direction and holds it. Formed to the extreme end surface of the guide bush 34 are a small diameter hole 35 for guiding the outside diameter portion of the movable side optical fiber ferrule 29 and a stepped hole 36 into which the ferrule holder 30 is inserted and held therein.

A latching solenoid 37 can reciprocate an actuator rod 38 inserted into the center thereof by switching the polarity of an instant current of 0.1 second or less. The latching solenoid 37 has such a function that it can remain at rest at both the ends of both strokes while keeping a prescribed holding force. A coupling rod 39 couples the actuator rod 38 with the ferrule holder 30. A coupling plate 40 is used to couple the latching solenoid 37 integrally with the guide bush 34 and mounted on the adapter plate 26.

FIG. 3 shows a state that the actuator rod 38 of the latching solenoid 37 is located at the lower end of the stroke. In this case, the ferrule holder 30 is pulled down together with the ferrule 29 with the movable side optical fiber by a distance corresponding to the stroke S of the actuator rod 38. The extreme end surface of the movable side optical fiber ferrule 29 can be released from the connection thereof to the extreme end surface of a ferrule 13 with a fixed side optical fiber as well as the movable side optical fiber ferrule 29 can move in X- and Y-directions by setting related dimensions to permit the extreme end surface of the movable side optical fiber ferrule 29 to be pulled out from the lower surface of the fixed side ferrule mounting plate 10 about 0.5 mm.

FIG. 4 shows a state that the actuator rod 38 of the latching solenoid 37 is located at the upper end of the stroke and the extreme end surface of the ferrule 29 with the movable side optical fiber is connected to the extreme end surface of the ferrule 13 with the fixed side optical fiber. In this case, the ferrule holder 30 is pulled up by the distance corresponding to the stroke S of the actuator rod 38 together with the ferrule 29 with the movable side optical fiber. As a result, the extreme end surface of the ferrule 29 with the movable side optical fiber can be urged against the extreme end surface of the ferrule 13 with the fixed side optical fiber and connected thereto by the force of the coil spring.

It should be noted that the extreme end surface 41 of the fixed side optical fiber ferrule 13 and the extreme end surface 42 of the ferrule 29 with the movable side optical fiber are polished to inclined spherical surfaces having an inclined angle of 4° or more with respect to a surface orthogonal to an optical axis in order to greatly reduce harmful return light which is generated, when the fixed side optical fiber is connected to the movable side optical fiber, on the connected surface by Fresnel reflection.

Figure 5:
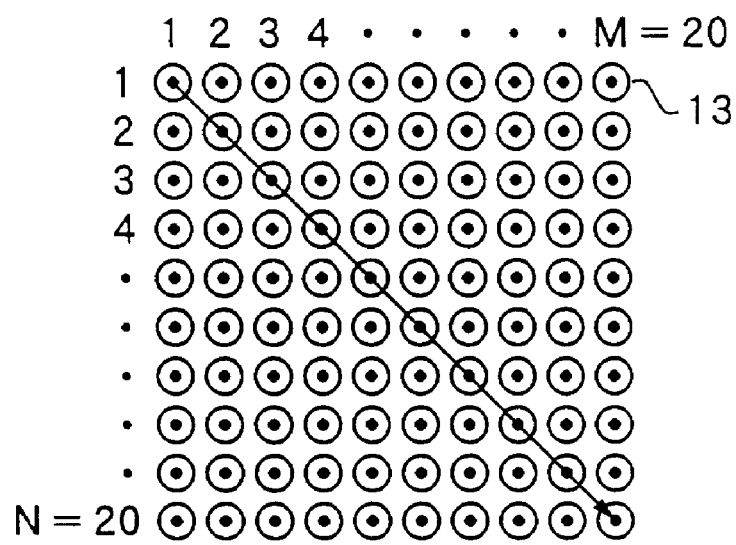
FIG. 5 is a schematic view showing an example the moving locus of the ferrule of the 1×400 circuit optical fiber switch.

FIG. 5 shows an example of the moving locus of the movable side optical fiber ferrule of the above optical fiber switch having the 1×400 circuits. The ferrules with the fixed side optical fibers of the 1×400 circuit optical fiber switch according to the present invention are disposed in the number of M=20 in the lateral (X) direction and in the number of N=20 in the longitudinal (Y) direction. Each of the ferrules is composed of an MU (miniature unit-coupling) type optical fiber ferrule having an outside diameter of 1.25 mm and adjacent pitches are set to 2.67 mm in both the lateral (X) direction and the longitudinal (Y) direction. Therefore, the size of the switch can be greatly reduced because the maximum disposing dimension of the ferrules is 50.73 mm×50.73 mm.

With the above arrangement, the ferrule with the movable side optical fiber can linearly move in a minimum distance in an oblique direction as shown by the arrow in the figure. As described above, the multi-circuit optical fiber switch of the present invention employs the drive mechanisms of the X-axis slide blocks and the Y-axis slide block each composed of the tooth-shaped rack and the pinion gear as the moving means of the ferrule with the movable side optical fiber. When the maximum dimensions of the ferrules with the fixed side optical fibers of the embodiment are 50.73 mm×50.73 mm in the lateral (X) direction and the longitudinal (Y) direction, the number of revolution of the stepping motor necessary to move the ferrule with the movable side optical fiber 50.73 mm is about 0.9. Thus, the optical fiber switch of the embodiment can perform a switching operation at a speed which is greatly higher than that of the conventional linearly moving type multi-circuit optical fiber switch employing the screw/nut drive system.

For example, as shown by the arrow, the actually measured value of the operating speed necessary to move the ferrule with the movable side optical fiber from a ferrule with a fixed side optical fiber located at a point (X·Y)=(1·1) to a ferrule with a movable side optical fiber located at a point (X·Y)=(20·20) which is farthest from the above point was about 0.9 second including an accelerating time and a decelerating time and the actually measured value of the operating speed between respective adjacent pitches was 0.3 second or less.

Figure 6:
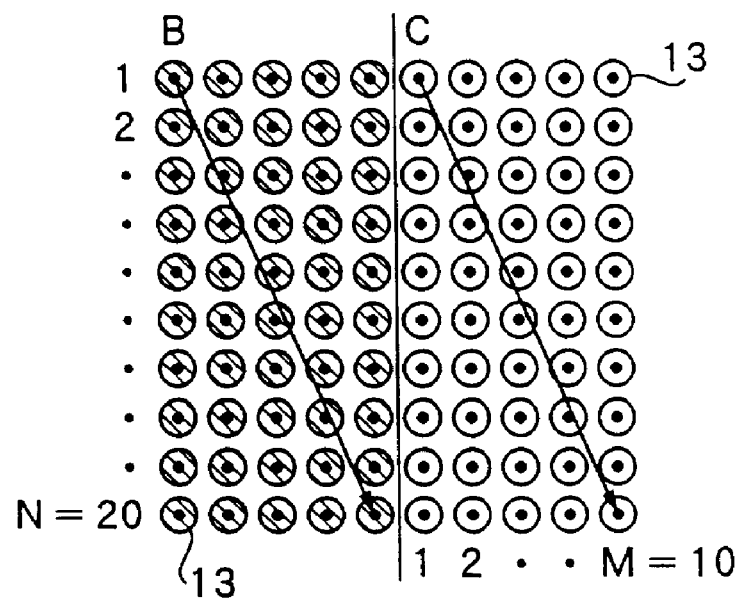
FIG. 6 is a schematic view showing an example the moving locus of the ferrule of a 2×400 circuit optical fiber switch arranged by the present invention.
Figure 7:
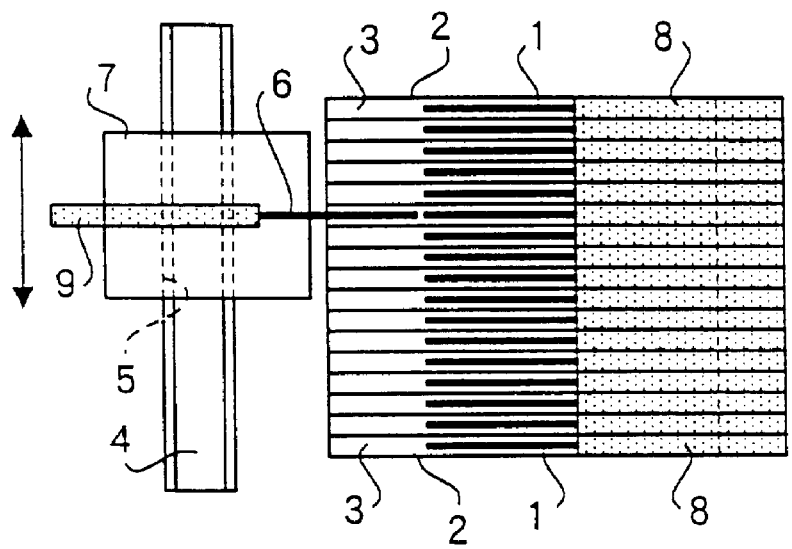
FIG. 7 is a plan view explaining the principle of a linearly moving type multi-circuit switch using a conventional optical fibers and lined-up V-shaped-groove arrays.
Figure 8:
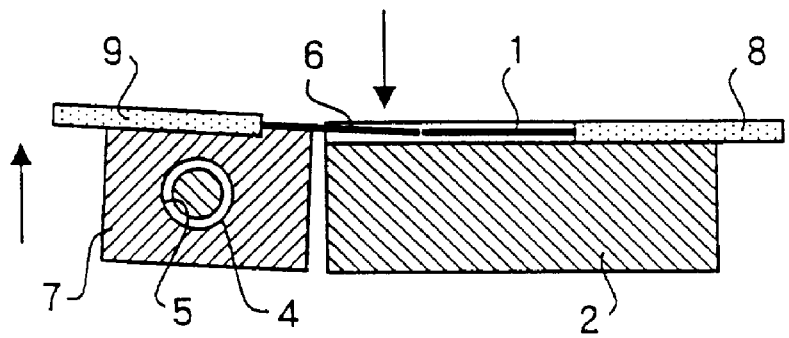
FIG. 8 is a front sectional view explaining the principle of the multi-circuit switch shown in FIG. 7.
Figure 9:
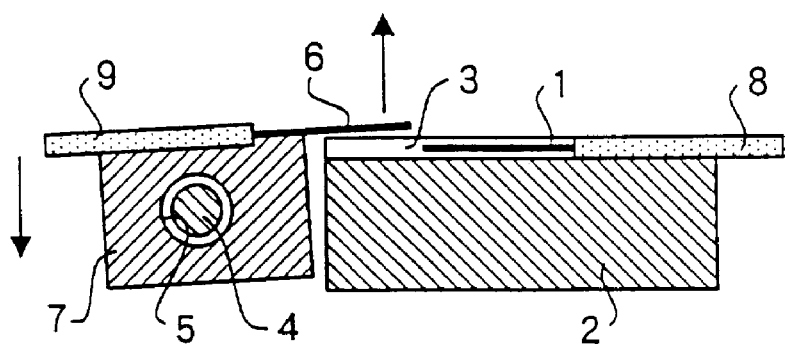
FIG. 9 is another front sectional view explaining the principle of the multi-circuit switch shown in FIG. 7.

FIG. 6 is a view showing another embodiment of the multi-circuit optical fiber switch of the present invention, that is, an optical fiber switch having 2×400circuits or an optical fiber switch having (1×200)×2 circuits. The 2×400 circuit optical fiber switch is arranged such that ferrules with fixed side optical fibers are disposed in the number of M=10 in the lateral (X) direction and in the number of N=20 in the longitudinal (Y) direction and two ferrules with movable side optical fibers are disposed at the points B and C on X-Y coordinates shown in FIG. 6. In this case, the embodiment can be simply arranged by disposing two ferrule holders 30 to the aforesaid one guide bush 34 without using individual X-, Y-direction drive mechanisms and individual Z-direction drive mechanisms. That is, even if there are the two movable side optical fibers, they can be driven by each one set of the X-,Y-direction drive mechanism and the Z-direction drive mechanism.

The above embodiment will be summarized as mentioned below. That is, the optical fiber switch of the embodiment is a 2×(M×N) orthogonally-disposed-type optical fiber switch which includes a fixed side ferrule mounting plate assembly composed of a flat plate member 10 which has stepped holes 11 formed thereto orthogonally in the number of M (M=1, 2 . . . ) in the longitudinal (Y) direction of the surface of the flat plate member 10 and in the number of N (N=2 . . . ) in the lateral (X) direction thereof, the stepped holes 11 having lined-up sleeves 12 and ferrules 13 with fixed side optical fibers inserted into the sleeves 12 and detachably fixed thereby, X-, Y-axis slide roller table assembly composed of an X-axis slide roller tables which are driven by a stepping motor 21 on a pair of slide rails 16 disposed on the back surface of the flat plate member 10 along the lateral (X) direction in parallel therewith and a Y-axis slide roller table (Y-axis slide block 20) which is driven by another stepping motor 24 on a slide rail 19 disposed to the X-axis slide roller tables, likewise, and a movable side ferrule assembly composed of a latching solenoid 37 mounted on the Y-axis slide roller table and reciprocating an actuator pin in a direction (Z) orthogonal to an X-Y plane and the ferrules 29 with the movable side optical fibers engaged with the actuator pin so as to be associated therewith, wherein when the X-axis slide roller table and the Y-axis slide roller table are driven simultaneously, the movable side ferrules 29 can be connected to a pair of fixed side ferrules 13 located at arbitrary positions.

The features of the multi-circuit optical fiber switch of the present invention will be summarized as mentioned below. Since the ferrules with the optical fibers and the lined-up sleeves, which have been used as the parts of the APC optical connector having been completed to the high technical level, are used as the basic components of the switch, the switch has an average connecting insertion loss within 0.5 dB, a reflected return light loss of −68 dB or less. Accordingly, the switch has an optical capability and an environment resistant capability which are as excellent as that of the APC light connector. The miniaturization of the switch and the increase of the switching operation speed thereof can be realized by such an arrangement that the ferrules with the fixed side fibers and the lined-up sleeves are disposed to the X-Y rectilinear coordinates as well as the ferrule with the movable side optical fiber is attached to the actuator driven in the Z-axis direction in the two-dimensionally movable X-, Y-slide blocks.

Since the switch is not arranged as the linearly moving type switch using the optical fibers which are liable to be broken and the lined-up V-shaped grooves as used in the prior art but uses the ferrules with the APC optical fibers composed of the optical fibers attached to the ferrules having sufficient mechanical rigidity, it is ensured that the reliability of the switch to breakage can be improved. Further, if a switch operation partly fails, only a faulty ferrule with an optical fiber or a faulty lined-up sleeve can be simply replaced and repaired.

As described above in detail, the embodiments of the multi-circuit optical fiber switch of the present invention use the ferrules with the optical fibers used to the APC optical connector which has been completed to the high technical level and the lined-up sleeves as the basic components of the switch. Then, the fixed side optical fiber ferrules and the lined-up sleeves are disposed on the X-Y rectilinear coordinates as well as the two-dimensionally movable X-, Y-slide blocks which are driven in the X- and Y-axis directions by the stepping motors are used. The ferrule with the movable side optical fiber is attached to the actuator driven in the Z-direction in the above slide blocks. The ferrule with the movable side optical fiber can be inserted into a lined-up sleeve located at an arbitrary position on the coordinates and connected to the fixed side optical fiber ferrule inserted into the lined-up sleeve. Accordingly, even in a multi-circuit optical fiber switch having several hundred or more of switching circuits, the size of the switch can be reduced, the speed of switching operation thereof can be increased, the optical performance and the reliability to breakage thereof can be improved as well as the switch can be easily maintained and repaired.

What is claimed is:

1. A multi-circuit optical fiber switch, comprising:

a fixed side ferrule assembly composed of a multiplicity of lined-up sleeves, a fixed side ferrule support member for two-dimensionally disposing the sleeves on an X-Y plane and supporting them and a multiplicity of fixed side optical fiber ferrules inserted into the lined-up sleeves and supported thereby; and a movable side ferrule assembly for supporting a movable side optical fiber ferrule and relatively two-dimensionally moving it on the X-Y plane with respect to the fixed side ferrule assembly as well as moving it in a direction (Z-direction) orthogonal to the X-Y plane by a Z-direction drive mechanism to thereby move the movable side optical fiber ferrule to an arbitrary sleeve of the fixed side ferrule assembly so that it can be attached thereto and detached therefrom and wherein:

the fixed side ferrule support member is composed of a flat plate member, stepped holes are formed to the flat surface member in the numbers of M (M=1, 2 . . . ) and N (N=1, 2 . . . ) in the lateral (X) direction and the longitudinal (Y) direction of the surface of the flat plate member so that they are orthogonal in the lateral direction and the longitudinal direction and the fixed side optical fiber ferrules are detachably inserted into the lined-up sleeves disposed to the respective stepped holes and fixed therein; and the movable side ferrule assembly comprises:

a coupling plate having a pair of X-axis slide blocks driven by a first stepping motor on a pair of slide rails disposed on the back surface of the fixed side ferrule mounting plate assembly along the lateral (X) direction in parallel therewith;

X-, Y-direction slide table assembly composed on a Y-axis slide block driven by a second stepping motor on a slide rail mounted on the coupling plate at right angles in the longitudinal (Y) direction; and a Z-direction drive mechanism mounted on the Y-axis slide block and reciprocating in a Z-direction, whereby the multi-circuit optical fiber switch is arranged as 1×(M×N) orthogonally-disposed-type switch.

2. A multi-circuit optical fiber switch according to claim 1, wherein the first stepping motor and the second stepping motor can be driven at the same time to thereby cause the movable side optical fiber ferrule to correspond to the arbitrary fixed side optical fiber ferrule.

3. A multi-circuit optical fiber switch, wherein the X-axis slide blocks of the orthogonally-disposed-type optical fiber switch according to claim 1 is driven by the power transmission made by the mesh between a gear disposed to the shaft of the first stepping motor mounted on the coupling plate and meshed and a linear-tooth-shaped rack disposed to the fixed side ferrule mounting plate assembly and the Y-axis slide table is driven by the power transmission made by the mesh between a gear disposed to the shaft of the second stepping motor mounted on the coupling plate and a linear-tooth shaped rack disposed to the Y-axis slide block.

4. An L×(M×N) orthogonally-disposed-type multi-circuit optical fiber switch, wherein a plurality of the movable side ferrule assemblies (L≧2) according to claim 1 are simultaneously used and the respective ones of the assemblies are caused to correspond to L (M×N) pieces of the fixed side ferrules according to claim 1 so that the movable side optical fibers can be simultaneously connected to the fixed side optical fibers.

5. A multi-circuit optical fiber switch according to claim 1, wherein the Z-direction drive mechanism reciprocating in the Z-direction is composed of a latching solenoid for reciprocating an actuator rod by switching the polarity of a current.

6. A multi-circuit optical fiber switch according to claim 1, wherein the extreme end surfaces of the respective fixed side ferrules and movable side ferrules of the orthogonally-disposed-type optical fiber switch are polished to inclined spherical surfaces having an inclined angle of 4° or more with respect to a surface orthogonal to an optical axis.

* * * * *